UNITED STATES PATENT OFFICE.

FRIEDRICH SINGER, OF OFFENBACH-ON-THE-MAIN, GERMANY, ASSIGNOR TO CORPORATION OF CHEMISCHE FABRIK GRIESHEIM-ELEKTRON, OF FRANKFORT-ON-THE-MAIN, GERMANY.

VAT DYESTUFF OF THE ANTHRACENE SERIES.

999,680.  Specification of Letters Patent.  Patented Aug. 1, 1911.

No Drawing.   Application filed December 8, 1910.  Serial No. 596,250.

*To all whom it may concern:*

Be it known that I, FRIEDRICH SINGER, doctor of philosophy, chemist, a subject of the German Emperor, and resident of Offenbach-on-the-Main, in the Grand Duchy of Hesse, Germany, with the post-office address No. 179 Mainstrasse, have invented new and useful Improvements in Vat Dyestuffs of the Anthracene Series, of which the following is a specification.

I have discovered that new valuable vat dyestuffs can be obtained by heating the products of reduction of anthraquinone, which result by condensation of two anthraquinone molecules on the meso-carbon-atom, as for instance dianthrone, dianthranole, bianthrone with condensing agents in presence of or without a diluent. As condensing agents may be used aluminium chlorid, ferric chlorid, antimony pentachlorid, chromic chlorid, sulfuric acid, chlorid of zinc, mercuric chlorid, stannic chlorid, and analogous acting substances.

The structural formulæ of the starting bodies are the following:

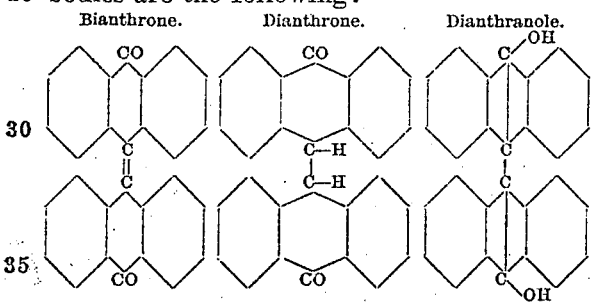

Bianthrone.  Dianthrone.  Dianthranole.

The new dyestuffs dye cotton from alkaline hydrosulfite vat brown shades of very good properties as to fastness.

The following examples will serve to illustrate the nature of my invention and how it can be carried out; parts being by weight.

Example I: 20 parts of dianthrone (obtained by oxydation of anthranole with ferric chlorid in glacial acetic acid solution: sparkling prisms of 245° C. melting point) are suspended in 200 parts of nitrobenzene, whereupon 20 parts of ground sublimated aluminium chlorid are added. The solution being green in the beginning, turns intensive red at a temperature of 120° C. under violent evolution of hydrochloric acid. The formation of dyestuff is completed after heating from 140° to 160° C. during 10 hours. The nitrobenzene is separated by passing through a current of steam. The remaining part is boiled out successively with hydrochloric acid, water and alcohol. The dyestuff is a brown black powder, soluble in concentrated sulfuric acid with brown violet color. It yields by treatment with alkaline hydrosulfite a garnet-brown vat dyeing cotton garnet-brown shades which, after rinsing and soaping, are converted in chocolate-brown ones of very good fastness. According to the quantity of aluminium chlorid used in the process and the temperature maintained dyestuffs of rather more green, respectively more red tint are obtained.

Example II: 20 parts of bianthrone (obtained by reduction of anthraquinone with zinc dust and caustic soda lye under pressure at 160° and subsequent oxidation of the alkaline solution with sodium hypochlorit: lemon colored compact crystals) are dissolved in nitrobenzene. 13 parts of aluminium chlorid are added, whereby the solution turns red. After heating up from 140° to 160° the formation of dyestuff is completed. The dyestuff is finished as described in Example I. It is a brown-black powder; soluble in concentrated sulfuric acid with violet-brown color. It yields by treatment with alkaline hydrosulfit solution a brown violet vat, dyeing cotton reddish-bronze-brown shades. The quantity and quality (proportion of oxychlorid) of the aluminium chlorid used in this process and the temperature maintained are of influence upon the formation of dyestuff.

Example III: From 20 parts of bianthrone and 20 parts of aluminium chlorid at temperatures from 80° to 90° C. a green-black dyestuff is obtained, soluble in concentrated sulfuric acid with bright blue-red color, and yielding a brown-red vat, dyeing cotton olive-brown shades.

Example IV: 20 parts of bianthrone, 20 parts of sublimated ferric chlorid and 200 parts of boiled out nitrobenzene are heated together up to 140° during 14 hours. The resulting dyestuff is a black powder, soluble in concentrated sulfuric acid with brown-violet color dyeing cotton from the garnet-brown vat greenish-bronze-brown shades.

Exemp V: In 200 parts of dry nitrobenzene an introduced while stirring successively 40 parts of bianthrone and 50 parts of antimony pentachlorid. The solution being green in the beginning, turns intensive red by heating under violet evolution of hydro-chloric acid. After heating for 1 to 2 hours the nitrobenzene is separated by passing a current of steam through mixture. The thus obtained black-brown dyestuff powder is soluble in concentrated sulfuric acid with yellow-brown color, dyeing cotton from the garnet-brown vat reddish-drab shades.

Example VI: 25 parts of dianthrone are introduced in 400 parts of sulfuric acid 60° Bé. and cautiously heated up to 120°. As soon as the evolution of sulfurous acid ceases the melt is poured in cold water, boiled out, the separated dyestuff isolated by filtration and washed with water. The thus obtained grey-black powder dissolves in concentrated sulfuric acid with brown-red color and yields by treatment with alkaline hydrosulfit a brown-violet vat, dyeing cotton bronze-brown shades. Instead of sulfuric acid 60° Bé., sulfuric acid of 66° Bé. or a more diluted one may be used. Instead of 120° C. a temperature of 180° may be maintained. Dianthranole and bianthrone may be also used for the manufacture of vat dyestuffs in the manner described in Example VI.

In the following table the properties of some of the dyestuffs are given:

| Dyestuff obtained from— | By condensing with— | At a temperature of— | Appearance. | Solution in concentrated sulfuric acid. | Solution in alkaline hydrosulfite. | Dyes unmordanted cotton— |
| --- | --- | --- | --- | --- | --- | --- |
| Dianthrone | Sulfuric acid 66° Bé | 80°–120° C | Black | Reddish brown | Grey-brown | Grey-brown |
| Dianthrone | Sulfuric acid 60° Bé | 120° | Grey-black | Brown-red | Violet-brown | Bronze-brown |
| Dianthrone | Sulfuric acid 60° Bé | 180° | Grey-black | Green-brown | Brown-black | Reddish-grey-brown |
| Dianthrone | Aluminium chlorid | 140°–160° | Brown-black | Brown-violet | Garnet-brown | Chocolate-brown |
| Dianthrone | Sulfuric acid 60° Bé | 120° | Grey-black | Brown-violet | Garnet-brown | Bronze-brown |
| Bianthrone | Ferric chlorid | 140° | Black | Brown-violet | Garnet-brown | Greenish-bronze-brown |
| Bianthrone | 65 per cent. of aluminium chlorid | 140°–160° | Brown-black | Violet brown | Violet-brown | Reddish-bronze-brown |
| Bianthrone | 100 per cent. of aluminium chlorid | 80°–90° | Green-black | Bright brown-red | Bright brown-red | Olive-brown |
| Bianthrone | Antimony pentachlorid | 160°–180° | Black-brown | Yellow-brown | Garnet-brown | Reddish-drab |
| Dianthranole | Aluminium chlorid | 160°–170° | Brown-black | Brown-violet | Violet-brown | Greenish-drab |
| Dianthranole | Sulfuric acid 66° Bé | 120° | Black | Brown-violet | Violet-brown | Reddish-bronze-brown |

Now what I claim and desire to secure by Letters Patent is the following:

1. The process for the manufacture of vat dyestuffs of the anthracene series, consisting in heating the products of reduction of anthraquinone, which result by condensation of two molecules of anthraquinone on the meso-carbon-atom, with condensing agents.

2. The process for manufacturing vat dyestuffs of the anthracene series, consisting in heating dianthrone with condensing agents.

3. The process for manufacturing a new vat dyestuff of the anthracene series, consisting in heating dianthrone with aluminium-chlorid.

4. The process for the manufacture of a new vat dyestuff of the anthracene series, consisting in heating dianthrone with aluminium chlorid in presence of a diluent.

5. The process for manufacturing a new vat dyestuff of the anthracene series, consisting in heating dianthrone with aluminium chlorid in presence of nitrobenzene as diluent.

6. As a new article the vat dyestuff of the anthracene series, obtainable by heating dianthrone with aluminium-chlorid in presence of nitro-benzene, which dyestuff is a brown black powder soluble in concentrated sulfuric acid with brown violet color, in concentrated nitric acid with the same color but with destruction of the dyestuff easily soluble in a warm solution of sodium sulfid with violet-brown color, yielding by treatment with alkaline hydrosulfite solution a garnet-brown vat, dyeing cotton garnet brown shades which, after rinsing and soaping, are converted into chocolate-brown ones of very good fastness.

In testimony, that I claim the foregoing as my invention, I have signed my name in presence of two witnesses, this twenty-fifth day of November 1910.

FRIEDRICH SINGER.

Witnesses:
 EVA LATTLER,
 HERMAN WEIL.